Patented Aug. 18, 1936

2,051,145

UNITED STATES PATENT OFFICE 2,051,145

CHLORINATED ARYL-THIAZOLES AND PROCESS FOR THEIR PRODUCTION

Herbert August Lubs and John Elton Cole, Wilmington, Del., assignors to E. I. du Pont de Nemours & Company, Wilmington, Del., a corporation of Delaware No Drawing. Original application May 6, 1931, Serial No. 535,560. Divided and this application May 26, 1934, Serial No. 727,729

5 Claims. (Cl. 260—44)

This application is a division of our copending application, Serial No. 535,560, filed May 6, 1931, which matured into Patent No. 1,984,714 on December 18, 1934.

This invention relates to the manufacture of chlorinated aryl thiazoles. More particularly it relates to the preparation of chlorinated aryl thiazoles having the probable formula

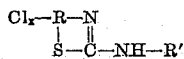

in which R and R' represent aryl radicals which may be alike or different and which may contain substituents, for example, halogen, alkyl and alkoxy, and $x$ represents an integer.

This invention has for an object the economical manufacture of halogenated-aryl-amino-aryl-thiazoles. Other objects are the production of new chemical compounds, of new chemical processes and in general an advancement of the art.

These objects are accomplished by treating compounds having the probable formula

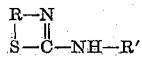

with chlorinating agents, wherein R and R' have the same significance as above.

It was not to be foreseen that this treatment would result in nuclearly chlorinated aryl-triazoles; for, as reported by Hunter and Styles in Journal of the Chemical Society (London), 1928, pp. 3023-4, and by Dyson, Hunter, and Soyka in the same Journal 1929, pp. 462-465, the direct bromination of 1-amino-benzothiazoles results in some complex, yellow colored, bromine addition-compounds of the thiazole, which readily lose their bromine upon standing in humid air or upon raduction, or undergo nuclear rearrangement upon recrystallization from alcohol. In our process, however, no such difficulties were experienced, but the chlorinated compound was obtained directly as a stable, white-colored body.

The invention will be further understood from a consideration of the following specific examples in which the parts are given by weight.

Example I

One hundred (100) parts of 1-ortho-toluidino-3-methyl-benzo-thiazole were suspended in 400 parts of nitro-benzene and 150 parts of sulphuryl chloride added to the well agitated mass. The solution was warmed for a few minutes at 60° C., cooled and filtered. The precipitate was washed with benzene to remove the nitrobenzene. The product consisted of the hydrochloride of 1-para-chloro-ortho-toluidino-3-methyl-5-chlor-benzo-thiazole. The free base was obtained from this compound by agitation with excess ammonia. It is a white solid, sparingly soluble in boiling ethyl alcohol, and melts at about 201.8 to 202.6° C. Its structure most probably corresponds to the formula

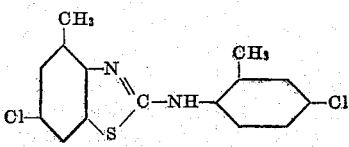

Example II

Twenty (20) parts of 1-ortho-toluidino-3-methyl-benzo-thiazole were suspended in 100 parts of nitrobenzene, and chlorine was passed in slowly at ordinary temperatures for eight hours (or until a test showed that the desired degree of chlorination had been obtained). The product was then removed by filtration and identified as in Example I.

As will be clear from the above examples this invention is applicable to a wide range of starting compounds. It is particularly applicable to the preparation of chlorinated aryl-amino-benzo-thiazoles especially benzo-thiazoles having the formula

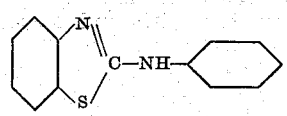

in each of which either or both of the aryl radicals may be substituted. Very desirable results have been obtained by the chlorination of benzo-thiazoles having the formula

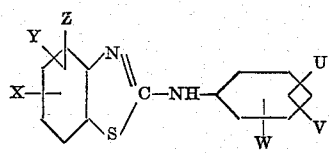

in which U, V, W, X, Y and Z represent members of the group consisting of hydrogen, alkyl and alkoxy. In particular, by chlorinating a suspension of 1-anilido-benzothiazole, 1-ortho-para-dichloranilido-5-chloro-benzothiazole may be obtained.

It is not intended that the invention be limited to the use of chlorine as a chlorinating agent since compounds producing similar effects may be used as sources of available chlorine. If desired, a chlorination catalyst such as iron, iodine and the like may be used.

A wide range of suspension agents may be used for example, nitrobenzene, nitrotoluene, acetic acid, ethylene dichloride, sulphur dioxide and the chloro-benzenes. Other solvents and/or suspension agents will be obvious to those skilled in the art. In certain instances it is possible to eliminate the use of a suspension agent or solvent by using an excess of the chlorinating agent. Since some of the starting compounds exhibit some solubility in some of the suspension media, it is intended that the term "suspension" as used in the specification and claims, be generic to, and cover the mixture of starting compound and the suspension medium whether a solution exists or not.

Pressure may be used to advantage in the invention above described, since it increases the solubility of the reacting gases in the solvents or suspension agents selected.

In the above description use has been made of the formula of the type

but it is realized that these compounds may exist in the tautomeric form having the formula

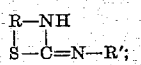

and for this reason, wherever the first mentioned formula is used in the specification and claims it is intended that it cover the compound regardless of the tautomeric form in which it actually exists.

As will be seen from the above examples, the products prepared according to my invention may be isolated either in basic form or in the form of their hydrochlorides. It will be clear therefore that the process claims hereunder are intended to cover any process comprising the particular steps therein set forth, regardless whether the ultimate object of the process is to prepare the free base form of the reaction product or a salt thereof.

The compounds above described are valuable as intermediates in the manufacture of dyestuffs.

As many apparently widely different embodiments of this invention may be made without departing from the spirit and scope thereof, it is to be understood that we do not limit ourselves to the specific embodiments thereof except as defined in the appended claims.

We claim:

1. A compound of the group consisting of 1-para-chloro-ortho-toluidino-3-methyl-5-chloro-benzothiazole and salts thereof, the basic form of said compound having the formula

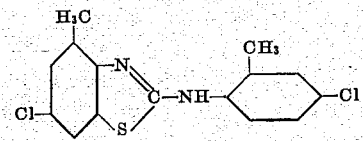

and being a white solid, sparingly soluble in boiling ethyl alcohol, and melting at about 201.8° to 202.6° C.

2. The process of preparing 1-para-chloro-ortho-toluidino-3-methyl-5-chloro-benzothiazole which comprises chlorinating a suspension of 1-ortho-toluidino-3-methyl-benzothiazole.

3. The process of preparing 1-ortho-para-dichloranilido-5-chloro-benzothiazole which comprises chlorinating a suspension of 1-anilido-benzothiazole.

4. The process which comprises treating a suspension of a compound having the formula

in which R and R' represent aryl radicals of the benzene and naphthalene series which may be alike or different, with a chlorinating agent until a test sample shows that the radical R has been chlorinated.

5. The process which comprises treating with a chlorinating agent a compound which in basic form corresponds to the formula

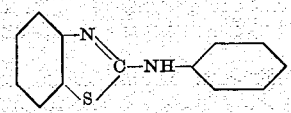

in which either or both of the benzene radicals are members of the group consisting of the unsubstituted phenyl radical and phenyl radicals substituted by alkyl, alkoxy or halogen, said treatment with a chlorinating agent being continued until a test sample shows that at least one of the benzene groups has been chlorinated.

HERBERT AUGUST LUBS.
JOHN ELTON COLE.